United States Patent [19]

Lehmann et al.

[11] 4,177,294

[45] Dec. 4, 1979

[54] AQUEOUS CLEANING CONCENTRATE FOR THE CLEANING OF FOODSTUFF

[75] Inventors: Hans-Jüergen Lehmann, Mettmann; Rolf Bietz, Monheim; Jüergen Wegner, Düsseldorf, all of Fed. Rep. of Germany

[73] Assignee: Henkel Kommanditgesellschaft auf Aktien (Henkel KGaA), Düsseldorf-Holthausen, Fed. Rep. of Germany

[21] Appl. No.: 948,221

[22] Filed: Oct. 3, 1978

[30] Foreign Application Priority Data

Oct. 8, 1977 [DE] Fed. Rep. of Germany ....... 2745371

[51] Int. Cl.$^2$ .............................................. A23L 3/34
[52] U.S. Cl. ........................................ 426/271; 134/40; 252/105; 252/106; 426/250; 426/286; 426/321; 426/425; 426/335; 426/654
[58] Field of Search ............... 134/28, 40; 252/105, 252/109, 106; 426/250, 271, 268, 286, 293, 302, 321, 335, 654, 656, 425, 506

[56] References Cited

U.S. PATENT DOCUMENTS

| 2,108,563 | 2/1938 | Mnookin et al. | 426/286 |
| 3,336,141 | 8/1967 | Frisina | 426/271 X |
| 3,526,511 | 9/1970 | Rockland | 426/271 X |
| 3,814,820 | 6/1974 | Busta et al. | 426/268 X |
| 3,943,063 | 3/1976 | Morishita et al. | 426/302 X |
| 4,133,901 | 1/1979 | Fetzer et al. | 426/302 X |
| 4,140,649 | 2/1979 | Bossert et al. | 426/271 X |

FOREIGN PATENT DOCUMENTS 228366 10/1958 Australia ................... 426/302

Primary Examiner—Robert L. Lindsay, Jr.
Attorney, Agent, or Firm—Hammond & Littell

[57] ABSTRACT

An aqueous concentrate for the cleansing of foodstuffs of animal or vegetable origin, consisting of:
(a) from 0.1% to 10% by weight of water-soluble to water-dispersible proteins,
(b) from 0.01% to 3% by weight of water-soluble polymers having a molecular weight of at least 10,000,
(c) from 1% to 15% by weight of a water-soluble sequestering agent,
(d) from 0.01% to 1% by weight of water-soluble food preservatives,
(e) from 0 to 0.5% by weight of food colors and food odorants, and
(f) the remainder to 100%, water.

8 Claims, No Drawings

AQUEOUS CLEANING CONCENTRATE FOR THE CLEANING OF FOODSTUFF

BACKGROUND OF THE INVENTION

In many instances it is desirable to wash feedstuffs of both animal and vegetable origin to rid the same of dirt, blood, insects and insect detritus, microorganisms, such as mold, mildew and pathogenic bacteria, etc. Water alone is not always efficient and ordinary additives to water, such as surface-active compounds, may give rise to a change in the taste appeal of the washed foodstuff.

OBJECTS OF THE INVENTION

An object of the present invention is the development of an aqueous concentrate for the cleansing of foodstuffs of animal or vegetable origin which adequately removes foreign matter therefrom without affecting the taste and aroma of the washed foodstuff.

Another object of the present invention is the development of an aqueous concentrate for the cleansing of foodstuffs of animal or vegetable origin, consisting of:
(a) from 0.1% to 10% by weight of water-soluble to water-dispersible proteins,
(b) from 0.01% to 3% by weight of water-soluble polymers having a molecular weight of at least 10,000,
(c) from 1% to 15% by weight of a water-soluble sequestering agent,
(d) from 0.01% to 1by weight of water-soluble food preservatives,
(e) from 0 to 0.5% by weight of food colors and food odorants, and
(f) the remainder to 100%, water.

These and other objects of the invention will become more apparent as the description thereof proceeds.

DESCRIPTION OF THE INVENTION

The present invention relates to cleaning preparations for cleaning foodstuffs of vegetable or animal origin consisting of:
  0.1% to 10% by weight of water-soluble to water-dispersible proteins,
  0.01% to 3% by weight of water-soluble polymers,
  1% to 15% by weight of sequestrants,
  0.01% to 1% by weight of preservatives and auxiliary substances,
in the form of an aqueous concentrate.

More particularly, the present invention relates to an aqueous concentrate for the cleansing of foodstuffs of animal or vegetable origin, consisting of:
(a) from 0.1% to 10by weight of water-soluble to water-dispersible proteins,
(b) from 0.01% to 3% by weight of water-soluble polymers having a molecular weight of at least 10,000,
(c) from 1% to 15% by weight of a water-soluble sequestering agent,
(d) from 0.01% to 1% by weight of water-soluble food preservatives,
(e) from 0 to 0.5% by weight of food colors and food odorants, and
(f) the remainder to 100%, water.

The preparations of the invention are characterized by the complete absence of surfactants or surface-active compounds and are physiologically harmless. They are low sudsing and do not cause skin irritations when used by hand.

The preparations are used as diluted aqueous solutions and are particularly suitable for cleansing vegetable products, such as fruits, vegetables, salad greens, potatoes, root vegetables, beets, mushrooms, etc. In addition, they can also be used for cleansing animal products, such as meat, fish, eggs, cheese wheels, etc. The cleansing can be effected by hand by washing, brushing, etc., or mechanically in the home, in restaurants, large kitchens, food- and feed-processing plants, etc. The dirt usually adhering to foodstuffs, such as earth, residues of fertilizer or pesticides, animal pests, and contamination caused by them are reliably removed. By rinsing with water, the cleaning preparations can be easily washed out.

Water-soluble to water-dispersible proteins that are suitable in the sense of the invention are obtained from animal or vegetable products, such as albumin from cattle plasma, egg albumin, sodium caseinate, gelatin, extracts from protein-containing seeds, etc. Because of the better clear solubility in water in the presence of salts, native proteins are particularly suitable, which requires, however, special precautions in their production and processing.

Particularly suitable among the proteins and protein hydrolysates obtained from vegetable products are primarily vegetable globulins, e.g., legumin and vivilin from peas, glycinin from soybeans, or phaseolin from beans. They are obtained in known manner, e.g., by extraction of protein-containing plants or their seeds or bulbs with salt solutions or solutions of weak alkalies, such as common salt solution, sodium sulfate, sodium bromide, sodium ethylenediaminetetraacetate, sodium nitrilotriacetate, calcium hydroxide, mixtures of monosodium and disodium phosphate, etc. The extraction of crushed peas or defatted soybeans can be effected, for example, with about a 10% common salt solution and the protein separated therefrom. Fatty plant parts, particularly seeds, are defatted before the extraction, preferably by treatment with organic solvents. All production methods are preferably carried out at temperatures which are below the denaturation temperature of the respective protein, that is, preferably below 70° C.

Animal proteins are likewise obtained according to known methods and are partly commercially available. They are already partly denatured at temperatures about 40° C.

The cleaning concentrate has a content of 0.1% to 10%, preferably 0.2% to 5% by weight, of the water-soluble proteins.

The sequestrants or water-soluble sequestering agents employed are, for example, the hydroxyl-carboxylates normally used in washing agents, such as the alkali metal citrates, lactates, tartrates, the amino-carboxylates, such as the alkali metal salts of ethylenediaminetetraacetic acid, nitrilotriacetic acid, as well as inorganic sequestering salts, such as the alkali metal phosphates and polyphosphates, preferably as sodium salts. If one of the above mentioned salts was used in the extraction of vegetable proteins, the separation of salt solution from the extracted protein and the separate addition of sequestrants is not necessary.

The content of sequestrants in the cleaning concentrate is from 1% to 15%, preferably 3% to 12%, by weight.

Furthermore, the cleaning solutions of the invention contain water-soluble polymers, particularly those having a molecular weight of at least 10,000. These are primarily polyvinyl alcohols with molecular weights of 10,000 to 500,000, preferably 50,000 to 100,000, with a degree of hydrolysis of 50% to 100%, as well as polyvinyl pyrrolidones with molecular weights of 10,000 to 1,000,000, preferably 500,000 to 1,000,000, or mixtures of these polymers. Other suitable water-soluble polymers are polymer-saccharide compounds, such as cellulose carboxylates or vegetable gums, also cellulose ethers, such as methyl cellulose, methylhydroxypropyl cellulose, hydroxyethylcellulose, methylhydroxyethyl cellulose, etc. The cleaning concentrate contains from 0.01% to 3%, preferably 0.02% to 3%, by weight of the water-soluble polymers.

Finally the cleaning mixtures contain preservatives, such as alkali metal and alkaline earth metal salts of sorbic acid, benzoic acid, formic acid, boric acid, or other preservatives which are particularly suitable for foods, in amounts of 0.01% to 1.0%, preferably 0.05% to 1%, by weight, if necessary together with coloring and odorizer substances utilized for foodstuffs.

The cleaning liquors are normally adjusted to a pH value of 6 to 8, but they can be used in a wide pH range of 5 to 10.

The following specific examples are illustrative of the invention without being limitative in any respect.

EXAMPLES

Preparation of Vegetable Proteins (1) 150 kg of yellow, dried peas were crushed, suspended for 30 minutes in 300 kg of a 10% common salt solution or sodium sulfate solution. The liquid was next separated in a sieve centrifuge, heated for 30 minutes to 70° C. with stirring, and the albumins were precipitated. About 10% filter aids (diatomite) were added and the product was filtered under pressure. Yield: 150 kg pea extract, about 5% protein (legumin, vicilin), in the form of a clear solution.

(2) 500 gm of deoiled soy grit were stirred for 30 minutes with 1,000 gm of a 0.03 molar calcium hydroxide solution. The soy grit residue was separated in a sieve centrifuge. The extract was pressure filtered with 10% diatomite and, subsequently, the soy protein was precipitated by adjusting the extract to a pH of 4.5 with dilute hydrochloric acid. The precipitated soy protein was obtained by filtering or decanting and was dried under gentle conditions. The dry extract is colloidally soluble in salt solutions.

(3) 3 kg of yellow, dried peas were crushed and suspended for 30 minutes in 6 kg of a 20% solution of sodium ethylenediaminetetraacetate (EDTA). The suspension was filtered under pressure. The extract was heated for 15 minutes with stirring to 70° C., and again filtered. Yield: 3 kg extract in the form of a clear solution which contains EDTA as a sequestrant.

Cleaning Preparation Formulations (4) The following ingredients were diluted with water to a final weight of 100 kg:
  15.0 kg pea extract of Example 1
  1.5 kg methylhydroxypropyl cellulose, viscosity of 1% solution = 20,000 cP
  7.5 kg sodium citrate
  0.1 kg of a preservative (Kathon 886®).
After mixing this concentrate with water in a ratio of 1:100, the cleaning preparation obtained is used for cleaning fruits and vegetables.

The preservative Kathon 886® is a mixture of (1) 5-chloro-2-methyl-4-isothiazolin-3-one calcium(II) chloride and (2) 2-methyl-4-isothiazolin-3-one calcium-(II) chloride.

(5) The following ingredients were diluted with water to a final weight of 100 kg:
  1.0 kg soy grit extract, dried, of Example 2
  0.5 kg polyvinylpyrrolidone, molecular weight about 40,000
  0.5 kg polyvinyl alcohol
  10.0 kg sodium lactate
  0.2 kg calcium sorbate.
After diluting this concentrate with water in a ratio of 1:50, the cleaning preparation obtained is used for cleaning meat and sausages.

(6) The following ingredients were diluted with water to a final weight of 100 kg:
  2.0 kg albumin from ox blood
  1.0 kg polyvinylpyrrolidone, molecular weight about 700,000
  5.0 kg sodium tartrate
  0.2 kg sodium sorbate.
40 ml of this concentrate in 2,000 ml water are used for cleaning potatoes or carrots.

(7) The following ingredients were diluted with water to a final weight of 100 kg:
  5.0 kg gelatin
  3.0 kg hydroxyethyl cellulose, viscosity about 30,000 cP
  8.0 kg sodium pyrophosphate
  4.0 kg sodium tripolyphosphate
  0.5 kg sodium benzoate.
The concentrate is suitable for cleaning lettuce contaminated with aphids and their excretion products.

(8) The following ingredients were diluted with water to a final weight of 100 kg:
  0.5 kg sodium caseinate
  2.0 kg methyl cellulose, viscosity of 1% solution = about 12,000 cP
  7.5 kg sodium pyrophosphate
  1.0 kg preservative (5-bromo-5-nitro-1,3-dioxane, 20% in propylene glycol).
50 ml of this concentrate, diluted with 2,000 ml of water, are used for cleaning potatoes, and leaf and root vegetables in the household.

(9) The following ingredients were diluted with water to a final weight of 1,000 gm:
  500.0 gm pea extract with EDTA of Example 3
  15.0 gm methylhydroxyethyl cellulose, viscosity of 1% solution = about 20,000 cP
  2.0 gm Kathon 886®
This preparation is used in accordance with the procedure of Example 4.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. An aqueous concentrate for the cleansing of foodstuffs of animal or vegetable origin, consisting of:
  (a) from 0.1% to 10% by weight of water-soluble to water-dispersible proteins,
  (b) from 0.01% to 3% by weight of water-soluble polymers having a molecular weight of at least 10,000,
  (c) from 1% to 15% by weight of a water-soluble sequestering agent, (d) from 0.01% to 1% by weight of water-soluble food preservatives, (e) from 0 to 0.5% by weight of food colors and food odorants, and (f) the remainder to 100%, water.

2. The aqueous concentrate of claim 1 wherein said proteins are native proteins.

3. The aqueous concentrate of claim 2 wherein said native proteins are from protein-containing seeds.

4. The aqueous concentrate of claim 3 wherein said native proteins from protein-containing seeds have been obtained by extraction of protein-containing seeds with aqueous solutions containing water-soluble compounds selected from the group consisting of inorganic salts, organic salts and weak alkalies.

5. The aqueous concentrate of claim 4 wherein said water-soluble compounds are organic salts of sequestering agents.

6. The aqueous concentrate of claims 1 or 2 wherein said water-soluble polymers are selected from the group consisting of polyvinyl alcohol, polyvinylpyrrolidone and cellulose ethers.

7. The aqueous concentrate of claims 1 or 2 wherein said water-soluble sequestering agent is an alkali metal salt of an acid selected from the group consisting of citric acid, lactic acid, tartaric acid, aminocarboxylic acids, phosphoric acid and polyphosphoric acid.

8. The aqueous concentrate of claims 1 or 2 where component (a) is present in an amount of from 0.2% to 5% by weight, component (b) is present in an amount of from 0.02% to 3% by weight, component (c) is present in an amount of from 3% to 12% by weight, and component (d) is present in an amount of from 0.05% to 1% by weight.

* * * * *